(12) United States Patent
Shiroshima

(10) Patent No.: US 12,511,829 B2
(45) Date of Patent: Dec. 30, 2025

(54) MAP GENERATION APPARATUS, MAP GENERATION METHOD, AND NON-TRANSITORY COMPUTER-READABLE MEDIUM STORING PROGRAM

(71) Applicant: NEC Corporation, Tokyo (JP)

(72) Inventor: Takahiro Shiroshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 257 days.

(21) Appl. No.: 18/036,624

(22) PCT Filed: Nov. 18, 2020

(86) PCT No.: PCT/JP2020/043003
§ 371 (c)(1),
(2) Date: May 11, 2023

(87) PCT Pub. No.: WO2022/107245
PCT Pub. Date: May 27, 2022

(65) Prior Publication Data
US 2023/0419605 A1    Dec. 28, 2023

(51) Int. Cl.
*G06T 17/05*   (2011.01)
*G06T 7/70*    (2017.01)
*G06V 10/44*   (2022.01)

(52) U.S. Cl.
CPC .............. *G06T 17/05* (2013.01); *G06T 7/70* (2017.01); *G06V 10/44* (2022.01)

(58) Field of Classification Search
None
See application file for complete search history.

(56) References Cited

U.S. PATENT DOCUMENTS

| | | | |
|---|---|---|---|
| 2010/0045701 A1* | 2/2010 | Scott | G06T 7/80 348/135 |
| 2014/0169636 A1* | 6/2014 | Hara | G06T 7/73 382/106 |
| 2018/0114293 A1* | 4/2018 | Isler | G06T 3/18 |

FOREIGN PATENT DOCUMENTS

| | | | |
|---|---|---|---|
| JP | 2015-045920 A | 3/2015 | |
| JP | 2017-156162 A | 9/2017 | |

(Continued)

OTHER PUBLICATIONS

International Search Report for PCT Application No. PCT/JP2020/043003, mailed on Dec. 28, 2020.

(Continued)

*Primary Examiner* — Kent W Chang
*Assistant Examiner* — Jonathan M Cofino
(74) *Attorney, Agent, or Firm* — Sughrue Mion, PLLC

(57) ABSTRACT

An object is to provide a map generation apparatus for improving the quality of an environment map created using virtual images. A map generation apparatus (10) according to the present disclosure includes: a map generation unit (11) configured to generate a three-dimensional map showing an environment around a photographing device by identifying shooting locations of a plurality of still images shot by the photographing device and restoring three-dimensional positions of feature points marked in each image of the plurality of the still images; a generation unit (12) configured to generate a virtual image when the three-dimensional positions of each of the feature points on the three-dimensional map corresponding to the feature points in the still images are shot from a virtual viewpoint; and an update unit (13) configured to update the three-dimensional map with reference to the virtual feature points in the virtual image.

10 Claims, 8 Drawing Sheets

(56) References Cited

FOREIGN PATENT DOCUMENTS

| | | |
|---|---|---|
| JP | 2019-045991 A | 3/2019 |
| JP | 2019-536170 A | 12/2019 |
| WO | 2018/159168 A1 | 9/2018 |

OTHER PUBLICATIONS

Wendel, Andreas et al., "Natural Landmark-based Monocular Localization for MAVs", 2011 IEEE International Conference on Robotics and Automation, May 9, 2011, pp. 5792-5799.
JP Office Action for JP Application No. 2022-563308, mailed on Feb. 6, 2024 with English Translation.

* cited by examiner

MAP GENERATION APPARATUS, MAP GENERATION METHOD, AND NON-TRANSITORY COMPUTER-READABLE MEDIUM STORING PROGRAM

This application is a National Stage Entry of PCT/JP2020/043003 filed on Nov. 18, 2020, the contents of all of which are incorporated herein by reference, in their entirety.

TECHNICAL FIELD

The present disclosure relates to a map generation apparatus, a map generation method, and a program.

BACKGROUND ART

In recent years, services using robots that are designed to move autonomously have become popular. For robots to move autonomously, they need to be aware of their surrounding environments and perform self-localization with high accuracy. Therefore, use of VSLAM (Visual Simultaneous Localization and Mapping), in which a process of creating an environment map based on videos shot by a robot and a process of the robot performing self-localization by referring to the created environment map are performed simultaneously, is being considered. In a general VSLAM, the points at the same position in a plurality of videos are recognized as feature points in a plurality of images (still images) that make up the plurality of videos, and the location of the camera that shot the respective videos is estimated from the difference between the feature points in the images, and the estimated location of the camera is recognized as the location of the robot. In such VSLAM, it is required to perform immediate processing.

Patent Literature 1 discloses that image transformation is performed on images acquired using a sensor to generate a virtual image seen from a virtual viewpoint. Furthermore, Patent Literature 1 discloses that feature points in the images acquired using a sensor and the feature points in the virtual image are used to identify 3D (three-dimensional) information to be used in creating an environment map. In Patent Literature 1, at an early stage of the VSLAM process, virtual images are generated using 3D information that may have a relatively large variance. As the VSLAM process proceeds, the accuracy of estimation of the 3D information improves, and virtual images of a satisfactory level are generated.

CITATION LIST

Patent Literature

Patent Literature 1: International Patent Publication No. WO 2018/159168

SUMMARY OF INVENTION

Technical Problem

In Patent Literature 1, there is a large error in virtual images generated at an early stage of VSLAM process as to the feature points in the 3D information to be used for generating the virtual images. Therefore, an environment map created using virtual images that are generated at an early stage of VSLAM process becomes a low-quality map with a low reproducibility of the real-world environment.

An object of the present disclosure is to provide a map generation apparatus, a map generation method, and a program, each configured to improve the quality of an environment map that is created using virtual images.

Solution to Problem

According to a first aspect of the present disclosure, a map generation apparatus includes: a map generation unit configured to generate a three-dimensional map showing an environment around a photographing device by identifying shooting locations of a plurality of still images shot by the photographing device and restoring three-dimensional positions of feature points marked in each image of the plurality of the still images; a virtual image generation unit configured to generate a virtual image of a case in which the three-dimensional positions of the feature points on the three-dimensional map corresponding to the feature points in the still images are shot from a virtual viewpoint; and an update unit configured to update the three-dimensional map with reference to the virtual feature points in the virtual image.

According to a second aspect of the present disclosure, a map generation method includes: generating a three-dimensional map showing an environment around a photographing device by identifying shooting locations of a plurality of still images shot by the photographing device and restoring three-dimensional positions of feature points marked in each image of the plurality of the still images; generating a virtual image of a case in which the three-dimensional positions of the feature points on the three-dimensional map corresponding to the feature points in the still images are shot from a virtual viewpoint; and updating the three-dimensional map with reference to the virtual feature points in the virtual image.

According to a third aspect of the present disclosure, a program is configured to cause a computer to: generate a three-dimensional map showing an environment around a photographing device by identifying shooting locations of a plurality of still images shot by the photographing device and restoring three-dimensional positions of feature points marked in each image of the plurality of the still images; generate a virtual image of a case in which the three-dimensional positions of the feature points on the three-dimensional map corresponding to the feature points in the still images are shot from a virtual viewpoint; and update the three-dimensional map with reference to the virtual feature points in the virtual image.

Advantageous Effects of Invention

According to the present disclosure, a map generation apparatus, a map generation method, and a program for improving the quality of an environment map created using virtual images can be provided.

EXAMPLE EMBODIMENT

First Example Embodiment

Figure 1:
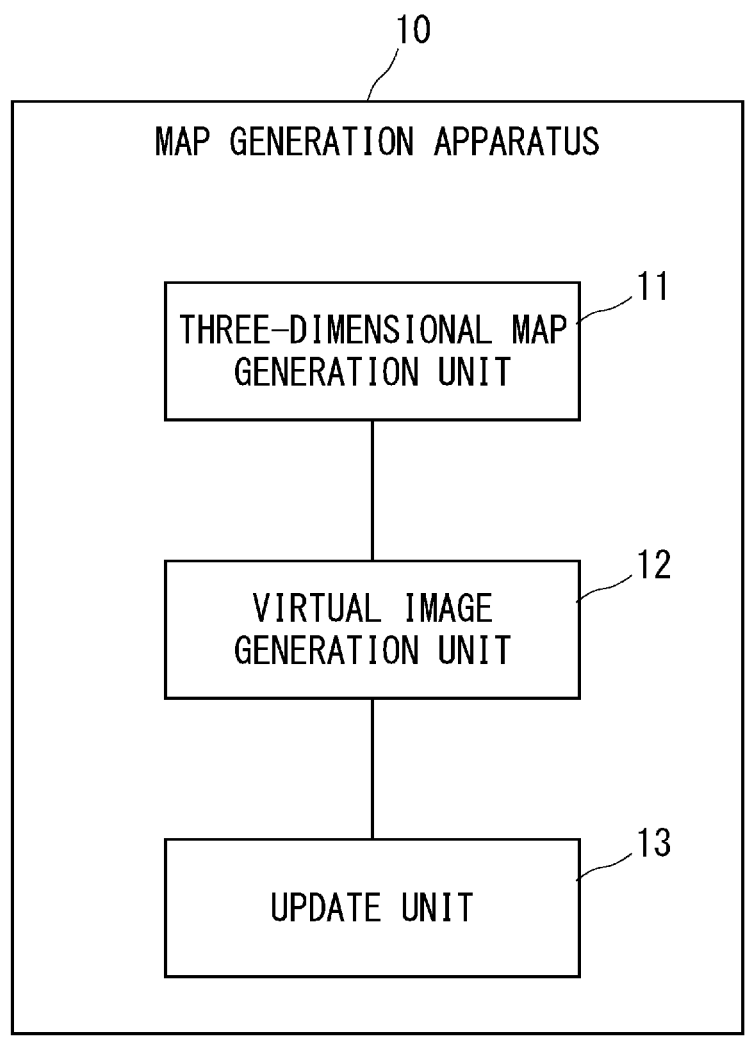
FIG. 1 is a configuration diagram of a map generation apparatus according to a first example embodiment.

Hereinbelow, example embodiments of the present disclosure will be described with reference to the drawings. A configuration example of a map generation apparatus 10 according to a first example embodiment will be described with reference to FIG. 1. The map generation apparatus 10 may be a computer device operated by having a processor execute programs stored in a memory. The map generation apparatus 10 may be, for example, a server device.

The map generation apparatus 10 includes a three-dimensional map generation unit 11, a virtual image generation unit 12, and an update unit 13. The three-dimensional map generation unit 11, the virtual image generation unit 12, and the update unit 13 may be software or modules in which processing is executed by the processor executing programs stored in a memory. Alternatively, the three-dimensional map generation unit 11, the virtual image generation unit 12, and the update unit 13 may be hardware, such as a circuit or a chip.

The three-dimensional map generation unit 11 generates a three-dimensional map by identifying the shooting locations of a plurality of still images shot by a photographing device and restoring the three-dimensional positions of the feature points marked in the still images. Specifically, the three-dimensional map generation unit 11 may generate a three-dimensional map by executing SfM (Structure from Motion) using a plurality of still images shot by a photographing device. The photographing device may be, for example, an image pick-up device such as a camera installed in a mobile terminal such as a smartphone. The photographing device may be built-in in the map generation apparatus 10. The plurality of still images may be, for example, a data set of a plurality of still images such as a plurality of frame images constituting a moving image, or a data record. Alternatively, the plurality of still images may be frame images extracted from the plurality of frame images constituting a moving image.

The SfM is a technique for calculating all the feature points of a series of two-dimensional images (or frames) that have been acquired and estimating the matching feature points from the plurality of images that are shot at different timings. Furthermore, the SfM is a technique for accurately estimating the three-dimensional position or a posture of the camera that took each frame based on the difference in the positions on the two-dimensional plane in the frame where each feature point appeared.

A three-dimensional map, which may also be referred to as an environment map, is a map in which the environment around a photographing device is shown using three-dimensional information. The three-dimensional information may be rephrased as 3D information, three-dimensional coordinates, or the like. The three-dimensional map includes map information showing the environment around a photographing device, as well as information about the posture of the photographing device. The posture of a photographing device includes, for example, information about the position and the inclination of a photographing device.

The virtual image generation unit 12 generates a virtual image of a case where the three-dimensional position on a three-dimensional map corresponding to the feature points in still images are shot from a virtual viewpoint. The feature points in still images may be detected using, for example, SIFT, SURF, ORB, AKAZE, or the like. The feature points in still images are indicated using two-dimensional coordinates. For the three-dimensional map used to identify the three-dimensional position corresponding to the feature points in still images, the map generated in the three-dimensional map generation unit 11 is used. The three-dimensional map generation unit 11 generates a three-dimensional map in advance using SfM. A three-dimensional map generated using SfM is more accurate in reproducing the surrounding environment than a three-dimensional map generated on a real time basis using images shot using VSLAM. As a result, the three-dimensional position identified with reference to a three-dimensional map generated using SfM have higher accuracy than the three-dimensional position identified with reference to a three-dimensional map generated using VSLAM.

A virtual viewpoint is a virtual viewpoint different from the viewpoint of a photographing device that actually performed shooting. These viewpoints may be rephrased as positions. For example, the virtual viewpoint may be a complementary position between the two locations where the photographing device actually performed shooting.

The update unit 13 updates the three-dimensional map generated in the three-dimensional map generation unit 11 with reference to the virtual feature points in the virtual image. The virtual feature points in the virtual image may be detected using SIFT, SURF, ORB, AKAZE, or the like. To update the three-dimensional map may mean that the update unit 13 generates a three-dimensional map with reference to a plurality of still images shot by a photographing device and at least one or more virtual images.

As described above, the map generation apparatus 10 can generate a virtual image with reference to the three-dimensional position on a three-dimensional map generated using SfM. Therefore, the virtual image generation unit 12 can generate a virtual image with higher accuracy than when using a three-dimensional map which is low in accuracy compared to a three-dimensional map generated using SfM, such as a three-dimensional map generated using VSLAM. As a result, the update unit 13 can improve the accuracy of the three-dimensional map generated in the three-dimensional map generation unit 11 to a higher level by referring to a highly accurate virtual image.

Second Example Embodiment

Figure 2:
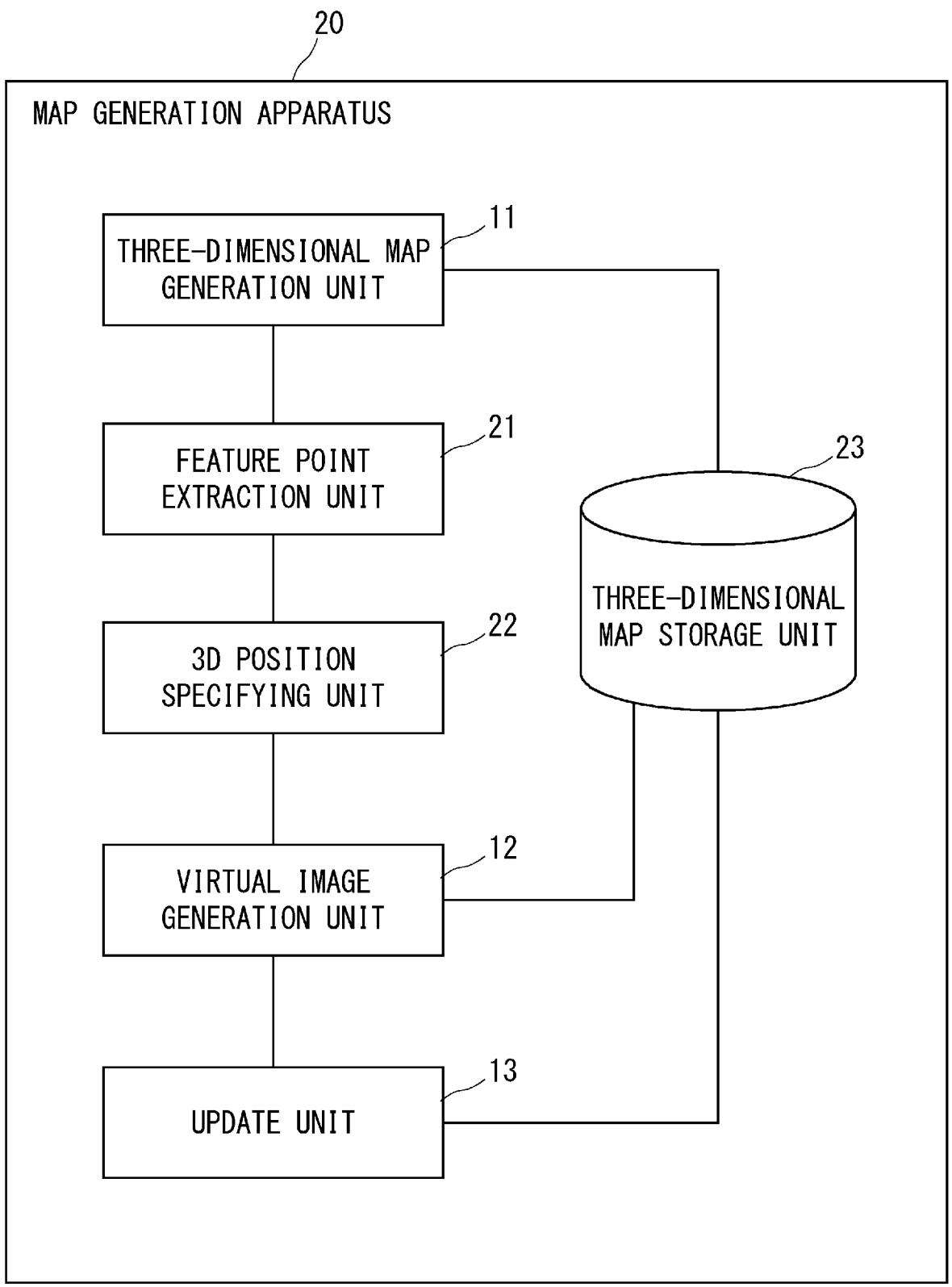
FIG. 2 is a configuration diagram of a map generation apparatus according to a second example embodiment.

Next, a configuration example of a map generation apparatus 20 according to a second example embodiment will be described with reference to FIG. 2. The structural components constituting the map generation apparatus 20, such as a three-dimensional map generation unit 11, the virtual image generation unit 12, the update unit 13, a feature point extraction unit 21, and a 3D position specifying unit 22, may be software or modules whose processing is executed by a processor executing programs stored in the memory. Alternatively, the structural components of the map generation apparatus 20 may be hardware, such as a circuit or a chip.

With regard to the three-dimensional map generation unit 11, the virtual image generation unit 12, and the update unit 13, descriptions of functions or operations similar to those described in FIG. 1 are omitted.

The three-dimensional map generation unit 11 stores a three-dimensional map created using SfM in a three-dimensional map storage unit 23. The three-dimensional map generation unit 11 executes SfM with reference to a plurality of two-dimensional images shot by a photographing device. Herein, the two-dimensional image used in executing SfM is referred to as an environmental image in the following explanation. The three-dimensional map storage unit 23 may be a memory built-in in the map generation apparatus 20. Alternatively, the three-dimensional map storage unit 23 may be an external memory that can be added to the map generation apparatus 20. Further, the three-dimensional map generation unit 11 also stores the environmental image used when executing the SfM in the three-dimensional map storage unit 23.

Furthermore, the three-dimensional map may include a depth map. A depth map is digital information in which the depth or depth dimension of each location within the angle of view of an environmental image is indicated as a numerical value. That is, the three-dimensional position of the feature points shown in two dimensions on the environmental image can be identified with reference to the depth map associated with the environmental image in corresponding relationship thereto. The three-dimensional position may be indicated using the three-dimensional coordinates.

The feature point extraction unit 21 detects feature points for VSLAM for each environmental image. Environment images are used, for example, in correcting the posture of a robot that moves autonomously. For example, an image shot on a real time basis by a moving robot is compared with an environmental image similar to the one that is shot on the real time basis among the environmental images used to generate a three-dimensional map using SfM. A comparison between an image shot on a real time basis and the environmental images is performed with reference to the feature points in each image. The posture of a robot is estimated and corrected based on the result of the comparison. Here, the estimation and correction of the posture of the robot are performed by VSLAM. In addition, in the present disclosure, robots are not limited to a form of a device as long as they can move, but broadly include, for example, robots that are shaped like humans or animals, conveyance vehicles that move using wheels (for example, Automated Guided Vehicles), and so on.

The feature point extraction unit 21 needs to detect feature points used in estimating and correcting the posture of the robot. Therefore, the feature point extraction unit 21 detects feature points for VSLAM in each environmental image using the same algorithm used in detecting feature points from the images shot on a real time basis. The algorithm used in detecting the feature points for VSLAM may be SIFT, SURF, ORB, AKAZE, etc.

The 3D position specifying unit 22 specifies the three-dimensional position of the feature points for VSLAM detected by the feature point extraction unit 21. Specifically, the 3D position specifying unit 22 specifies the three-dimensional position of the feature points for VSLAM with reference to the depth map associated with the environmental images containing the feature points for VSLAM.

The virtual image generation unit 12 includes information about the camera parameters used to generate a virtual image and a virtual camera posture of a virtual camera. The camera parameters include information about the angle of view, which generally consists of the number of horizontal pixels, the number of vertical pixels, and the focal length between the optical sensor and the lens. The information about the camera parameters and the virtual camera posture may be entered into the map generation apparatus 20 in advance by a manager or the like of the map generation apparatus 20. The camera parameters may be the same as the camera parameters for the camera that shot the environmental images. A virtual camera is a camera intended to be used when shooting from a virtual viewpoint. The virtual camera posture is information indicating the position and inclination of the virtual camera. Further, the virtual image generation unit 12 also has information about a virtual frame in which the vertical and horizontal dot sizes of the image shot by the virtual camera are defined.

The virtual image generation unit 12 generates a virtual image shot by the virtual camera with reference to a plurality of environmental images. At this time, the virtual image generation unit 12 may generate a virtual image with reference to all the environmental images referred to in executing the SfM, or it may generate a virtual image with reference to several environmental images selected from the plurality of environmental images. For example, the virtual image generation unit 12 may select an environmental image having a field of view that overlaps the field of view of the virtual camera.

Figure 3:
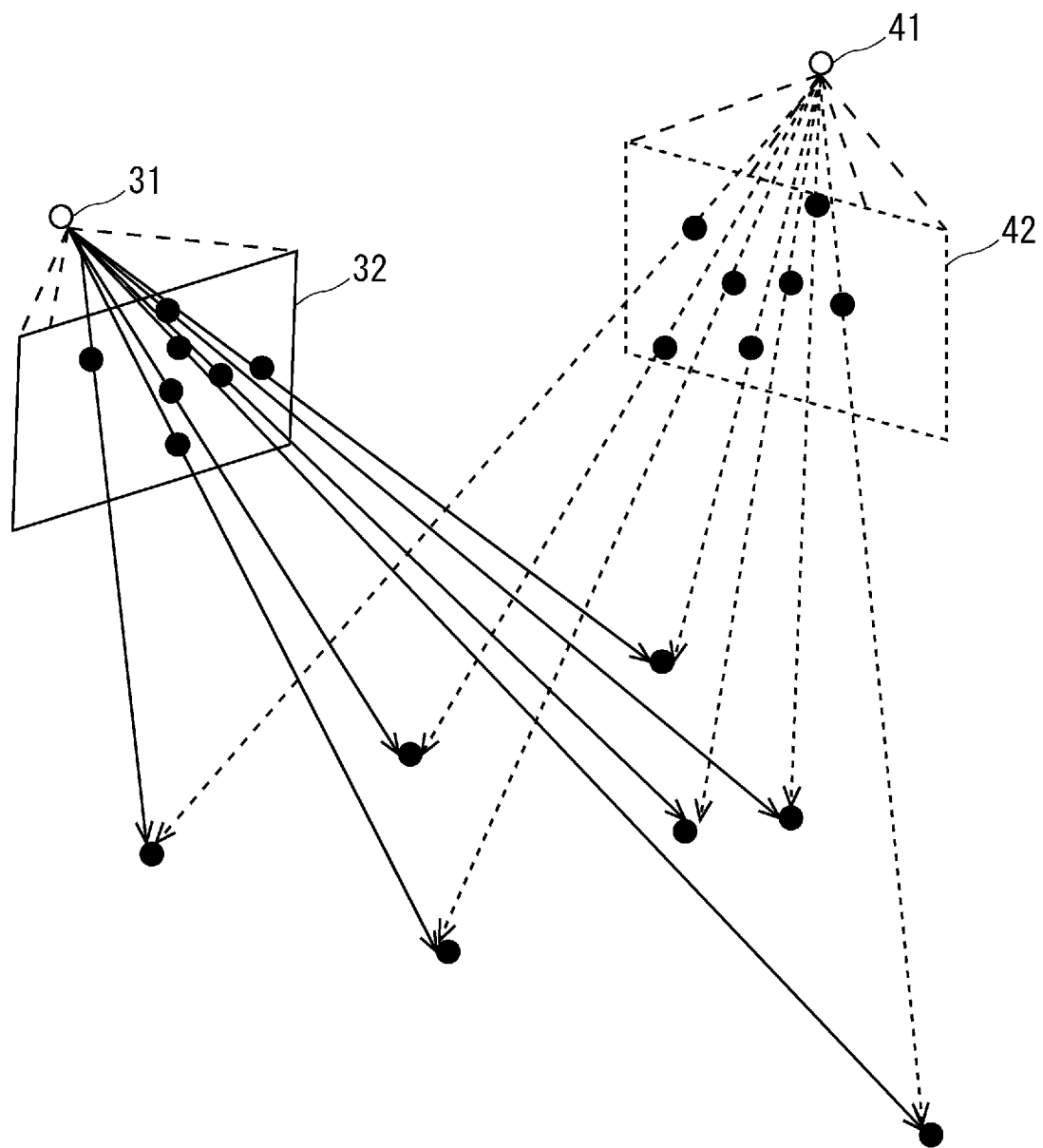
FIG. 3 is a diagram showing an overview of virtual image generation processing according to the second example embodiment.
Figure 4:
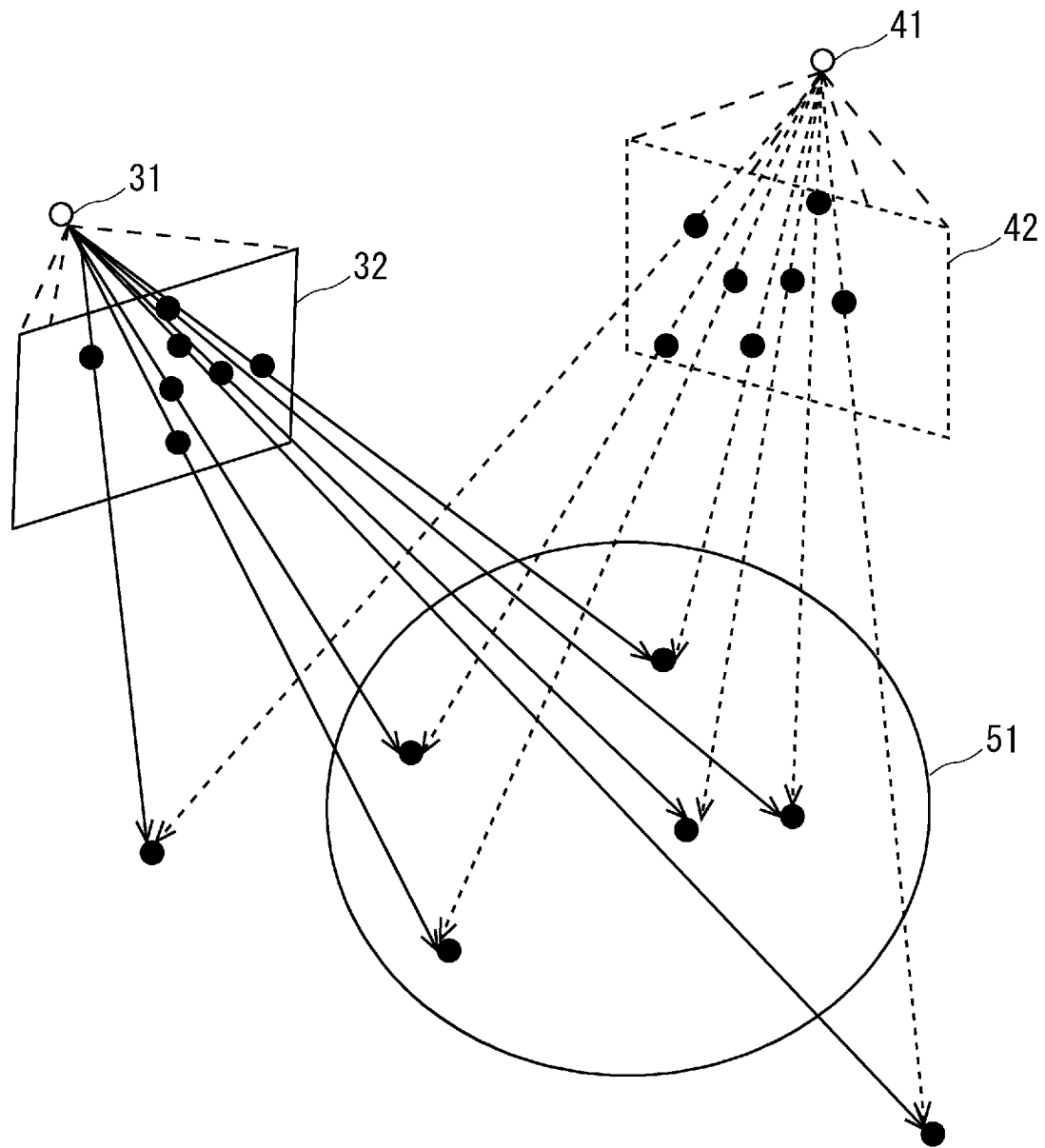
FIG. 4 is a diagram showing an overview of virtual image generation processing according to the second example embodiment.
Figure 5:
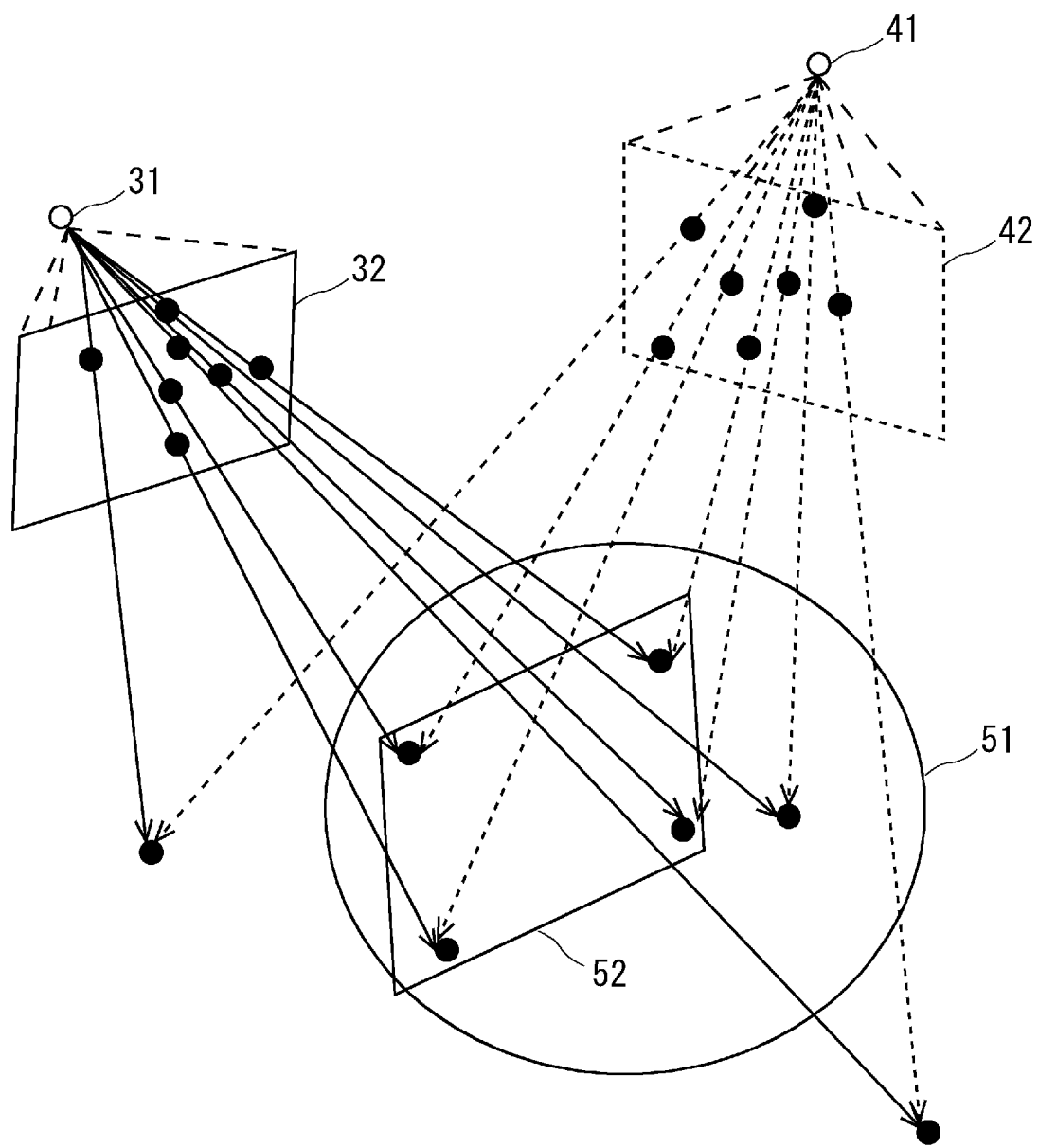
FIG. 5 is a diagram showing an overview of virtual image generation processing according to the second example embodiment.

Now, with reference to FIGS. 3 to 5, the processing of generating a virtual image performed by the virtual image generation unit 12 will be described. The processing of generating a virtual image includes (1) extraction processing of visible feature points, (2) extraction processing of nearest neighbor feature points, (3) extraction processing of planar feature points, (4) projective transformation processing, (5) projective transformation feature point extraction processing, and (6) virtual feature point extraction processing.

First, (1) extraction processing of visible feature points will be described with reference to FIG. 3. The virtual image generation unit 12 projects the 3D feature points in the three-dimensional space of the 2D feature points in an environmental image 32 shot by a photographing device 31 onto a virtual frame 42, which is a size of an image if shot by a virtual camera 41. The feature points in the virtual frame 42 show the feature points when the 3D feature points in the three-dimensional space of the 2D feature points in the environmental image 32 shot by the photographing device 31 are projected onto the virtual frame 42. In FIG. 3, the feature points in the environmental image 32 and the virtual frame 42 are defined as the 2D feature points, and the other feature points in the three-dimensional space are defined as the 3D feature points. In addition, the 3D feature points shown in FIG. 3 are referred to as the visible feature points.

Next, with reference to FIG. 4, (2) extraction processing of nearest neighbor feature points will be described. The virtual image generation unit 12 extracts nearest neighbor feature points located in close proximity to each other from among the visible feature points. For example, for the three-dimensional position of each visible feature point, the virtual image generation unit 12 extracts the visible feature points existing in a sphere of radius r (r is a real number equal to or greater than 0) as nearest neighbor feature points using the radius nearest neighbor algorithm. An area 51 in FIG. 4 shows a sphere of radius r. In FIG. 4, feature points existing in the area 51 show nearest neighbor feature points.

The virtual image generation unit 12 may determine, for all visible feature points, whether or not they exist in the sphere of radius r, or may determine, for some of the visible feature points sampled from among all the visible feature points, whether or not they exist in the sphere of radius r.

Next, (3) extraction processing of planar feature points will be described with reference to FIG. 5. The virtual image generation unit 12 extracts the planar feature points in an arbitrary plane 52 from among the nearest neighbor feature points. FIG. 5 shows that four of the five number of nearest neighbor feature points in the area 51 are on the plane 52.

The plane 52 may be defined, for example, by performing principal component analysis. For example, the virtual image generation unit 12 performs principal component analysis on the three-dimensional position of nearest neighbor feature points in the area 51. At this time, the virtual image generation unit 12 may define the plane containing first and second principal components, obtained as a result of performing principal component analysis, as the plane 52. The first principal component indicates the direction in which the distribution of the nearest neighbor feature points is the widest with respect to the center position (the center point) of the space in which the nearest neighbor feature points are distributed, and the second principal component indicates the direction in which the distribution of the nearest neighbor feature points is the second widest.

Furthermore, the virtual image generation unit 12 calculates the distance between the nearest neighbor feature points and the plane 52 by calculating the inner product of a vertical unit vector of a third principal component indicating the vertical direction of the plane 52 and a vector directed from the center point to the nearest neighbor feature points in the principal component analysis. The virtual image generation unit 12 may also regard the nearest neighbor feature points, which exist at positions where the distance to the plane 52 is equal to or less than a threshold value, as being on the plane 52. That is, the virtual image generation unit 12 extracts the nearest neighbor feature points that are on the plane 52 and the nearest neighbor feature points that are existing at a position where the distance to the plane 52 is equal to or less than the threshold value, as the planar feature points.

Next, (4) projective transformation processing will be described. The virtual image generation unit 12 derives a homography matrix from the feature points in the environmental image 32 corresponding to the planar feature points and from the feature points in the virtual frame 42 corresponding to the planar feature points using the RANSAC method. The homography matrix is represented, for example, as a 3×3 matrix. In this way, the homography matrix can be derived by specifying the two-dimensional coordinates of the images corresponding to the environmental image 32 and the virtual frame 42. Specifically, the 2D feature points in the environmental image 32 and the 2D feature points in the virtual frame 42 correspond to one 3D feature point.

Here, when deriving the homography matrix, the virtual image generation unit 12 needs to use the 2D feature points in the environmental image 32 corresponding to the 3D feature points that are on the same plane in the three-dimensional space. In other words, if the 3D feature points corresponding to all the 2D feature points in the environmental image 32 used when deriving the homography matrix are not on the same plane, the virtual image generation unit 12 cannot derive the correct homography matrix. Therefore, the virtual image generation unit 12 extracts the 3D feature points on the plane 52 in (3) extraction processing of planar feature points.

The virtual image generation unit 12 performs projective transformation of the environmental image 32 using the derived homography matrix to thereby generate a virtual image.

Next, (5) projective transformation feature point extraction processing will be described. The virtual image generation unit 12 detects feature points related to a virtual image that has been subjected to projective transformation using a homography matrix. For example, the virtual image generation unit 12 may use SIFT, SURF, ORB, AKAZE or the like as an algorithm for extracting feature points. Furthermore, the virtual image generation unit 12 may extract feature points of the virtual image using the same algorithm as that used in the feature point extraction unit 21. The feature points related to the virtual image that has been subjected to the projective transformation are referred to as projective transformation feature points. Further, the virtual image generation unit 12 may detect feature points for the entire virtual image or for a partial region of the virtual image. A partial region of the virtual image may be, for example, a region of the virtual image that is the same as a region containing the region with the 2D feature points in the virtual frame corresponding to the planar feature points. Some regions of the virtual image may be, for example, rectangular regions containing regions with the planar feature points in the virtual frame corresponding to the planar feature points.

Next, (6) virtual feature point extraction processing will be described. The feature points in the virtual image after the environmental image 32 has been subjected to projective transformation using the homography matrix may not coincide with the 2D feature points when the planar feature points, which are 3D feature points, are projected on the virtual frame 42 due to the enlargement, reduction, and movement of pixels by the projective transformation. Therefore, the virtual image generation unit 12 extracts the projective transformation feature points that coincide with the 2D feature points when the planar feature points are projected on the virtual frame 42, as the virtual feature points. The points coinciding with each other may include a case where the distance between the projective transformation feature points and the projected 2D feature points is equal to or less than the threshold value.

The update unit 13 stores the virtual feature points extracted by the virtual image generation unit 12 in the three-dimensional map storage unit 23. Specifically, the update unit 13 stores, in the three-dimensional map storage unit 23, the vector representation of the feature points obtained when performing detection of the feature points and the three-dimensional position of the 3D feature points corresponding to the virtual feature points in (5) projective transformation feature point extraction processing. Furthermore, the update unit 13 also stores the posture of the virtual camera in the three-dimensional map storage unit 23.

Furthermore, the update unit 13 may store the virtual feature points associated with the environmental image before they are subjected to the projective transformation in the three-dimensional map storage unit 23. Further, the processing from (1) extraction processing of visible feature points to (6) virtual feature point extraction processing may be repeatedly executed for different environmental images. As a result, one feature point in the virtual image may be associated with a plurality of environmental images.

Figure 6:
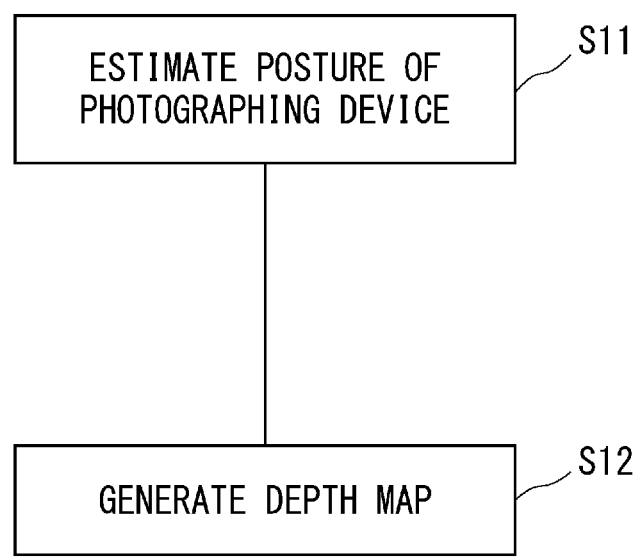
FIG. 6 is a diagram showing a flow of pre-processing according to the second example embodiment.

Next, the flow of pre-processing executed in the map generation apparatus 20 according to the second example embodiment will be described with reference to FIG. 6.

Pre-processing is a processing executed before the map generation apparatus 20 executes the processing of generating a virtual image.

First, the three-dimensional map generation unit 11 estimates the posture of the photographing device that shot the environmental image and the three-dimensional structure of the surrounding environment of the photographing device by executing SfM for a plurality of environmental images (S11). The three-dimensional structure of the surrounding environment may also be referred to as an environmental map. The posture of the photographing device includes the position and inclination of the photographing device in the three-dimensional space.

Next, the three-dimensional map generation unit 11 generates a depth map using the posture of the photographing device and the three-dimensional position of the feature points in the environmental image (S12). The three-dimensional map generation unit 11 generates, for example, a depth map of the field of view in the environmental image for each environmental image. The three-dimensional map generation unit 11 stores, in the three-dimensional map storage unit 23, the posture of the photographing device and the three-dimensional structure of the surrounding environment estimated in Step S11 and the depth map generated in Step S12.

The three-dimensional map generation unit 11 performs pre-processing including estimation of the posture of the photographing device using SfM and generation of the depth map at an arbitrary timing before the generation of a virtual image.

Figure 7:
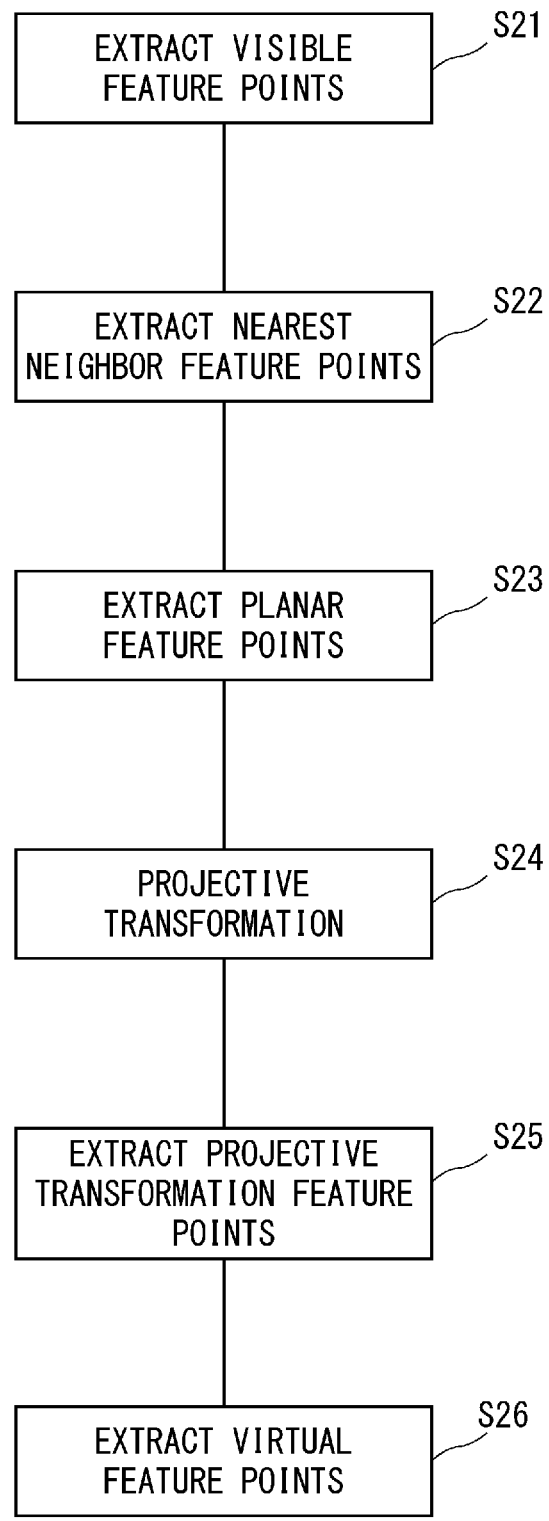
FIG. 7 is a diagram showing a flow of virtual image generation processing according to the second example embodiment.

Next, the flow of the virtual image generation processing performed in the map generation apparatus 20 according to the second example embodiment will be described with reference to FIG. 7.

First, the virtual image generation unit 12 extracts the visible feature points (S21). Among the 3D feature points corresponding to the 2D feature points in the environmental image 32, the visible feature points are the 3D feature points that could be projected on the virtual frame 42. That is, the visible feature points are the 3D feature points corresponding to both the 2D feature points in the environmental image 32 and the 2D feature points in the virtual frame 42.

Next, the virtual image generation unit 12 extracts the nearest neighbor feature points (S22). The nearest neighbor feature points are the visible feature points existing in the sphere of radius r. That is, the virtual image generation unit 12 extracts the visible feature points existing in the sphere of radius r from the plurality of visible feature points as the nearest neighbor feature points.

Next, the virtual image generation unit 12 extracts the planar feature points (S23). The planar feature points are nearest neighbor feature points that exist on an arbitrary plane in the three-dimensional space. That is, the virtual image generation unit 12 extracts, from the plurality of the nearest neighbor feature points, the nearest neighbor feature points on the plane containing the first and second components obtained by performing principal component analysis on the nearest neighbor feature points as the planar feature points. The virtual image generation unit 12 may also extract, as the planar feature points, the nearest neighbor feature points whose distance away from the plane is within the threshold value.

Next, the virtual image generation unit 12 derives a homography matrix for performing projective transformation of the environmental image 32 (S24). The virtual image generation unit 12 derives a homography matrix from the feature points in the environmental image 32 corresponding to the planar feature points and from the feature points in the virtual frame 42 corresponding to the planar feature points using the RANSAC method.

Next, the virtual image generation unit 12 extracts the projective transformation feature points (S25). The projective transformation feature points are the feature points in the virtual image obtained by performing projective transformation of the environment image 32. The feature points in the virtual image may be extracted using, for example, an algorithm such as SIFT, SURF, ORB, AKAZE, etc.

Then, the virtual image generation unit 12 extracts the virtual feature points (S26). The virtual feature points are, among the projective transformation feature points, the feature points that appear at positions that coincide with the planar feature points projected on the virtual frame 42. Among the projective transformation feature points, a feature point that is within a distance of a threshold value from the planar feature points projected on the virtual frame 42 may also be included in the virtual feature points.

As described above, the map generation apparatus 20 generates a depth map corresponding to the environment image in using SfM in pre-processing. Furthermore, the map generation apparatus 20 uses the depth map to specify the three-dimensional position the feature points in the virtual image obtained when shooting the three-dimensional position from the virtual viewpoint. In this case, the three-dimensional position of the feature points in the virtual image can be specified with higher accuracy than when the three-dimensional map generated on a real time basis in the VSLAM is used.

As a result, the reproduction accuracy of the real environment in the virtual image generated using the map generation apparatus 20 is higher than when the three-dimensional map generated in the VSLAM without using SfM is used, resulting in a high-quality virtual image.

For example, when estimating the posture of a moving robot on a real time basis, the apparatus can also use high-quality virtual images to estimate the posture of the robot. As a result, the accuracy of estimation of the position of the robot can be improved.

In the case where the posture of a moving robot is estimated on a real-time basis, an image to be compared with the real-time image is extracted from the environmental image and the virtual image. As a result, the number of images to be compared with the real-time image increases, and the estimation accuracy of the posture of the robot can be improved. Furthermore, the virtual feature points of the virtual image are stored in the map generation apparatus 20. Therefore, when the posture of a moving robot is estimated on a real-time basis, the number of feature points that match the feature points in the real-time image increases, and the estimation accuracy of the posture of the robot can be improved.

In addition, the map generation apparatus 20 can manage a plurality of environmental images associated with one feature point in the virtual image. This can increase the number of images that may be matched with the images shot on a real-time basis when estimating the posture of the robot on a real-time time.

Figure 8:
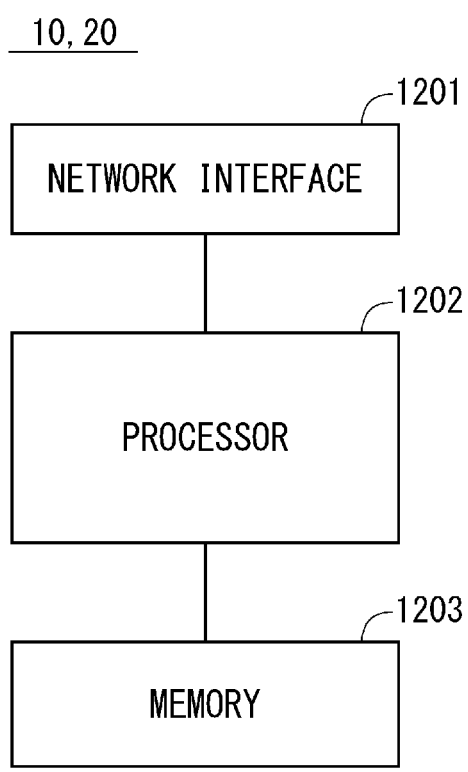
FIG. 8 is a configuration diagram of a map generation apparatus according to each of the example embodiments.

FIG. 8 is a block diagram showing a configuration example of the map generation apparatus 10 and the map generation apparatus 20 (hereafter, referred to as the map generation apparatus 10, etc.). Referring to FIG. 8, the map generation apparatus 10, etc., includes a network interface 1201, a processor 1202, and a memory 1203. The network interface 1201 may be used to communicate with a network node (e.g., eNB, MME, P-GW). The network interface 1201 may include, for example, a network interface card (NIC) that complies with the IEEE 802.3 series. Here, eNB stands for evolved Node B, MME stands for Mobility Management Entity, and P-GW stands for Packet Data Network Gateway. IEEE stands for Institute of Electrical and Electronics Engineers.

The processor 1202 reads software (computer program) from the memory 1203 and executes it to thereby perform processing by the controller 10 and the like described with reference to the flowcharts in the aforementioned embodiment embodiments. The processor 1202 may be, for example, a microprocessor, an MPU, or a CPU. The processor 1202 may include more than one processor.

The memory 1203 is composed of a combination of a volatile memory and a non-volatile memory. The memory 1203 may include a storage disposed distant from the processor 1202. In this case, the processor 1202 may access the memory 1203 via an I/O (Input/Output) interface, which is not shown.

In the example of FIG. 8, the memory 1203 is used to store a group of software modules. The processor 1202 reads out these groups of software modules from the memory 1203 and executes them, whereby it is possible to perform processing by the map generation apparatus 10 described and the like described in the aforementioned example embodiments.

As described above with reference to FIG. 8, each of the processors included in the map generation apparatus 10 or the like in the aforementioned example embodiments executes one or more programs including a group of instructions to cause the computer to perform the algorithm described with reference to the drawings.

Further, the aforementioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

Note that the present disclosure is not limited to the above-described example embodiments, and can be appropriately changed without departing from the gist of the present disclosure.

The whole or part of the example embodiments disclosed above can be described as, but not limited to, the following supplementary notes.

(Supplementary Note 1)

A map generation apparatus comprising:
a map generation unit configured to generate a three-dimensional map showing an environment around a photographing device by identifying shooting locations of a plurality of still images shot by the photographing device and restoring three-dimensional positions of feature points marked in each image of the plurality of the still images;
a virtual image generation unit configured to generate a virtual image of a case in which the three-dimensional position of each of the feature points on the three-dimensional map corresponding to the feature points in the still images is shot from a virtual viewpoint; and
an update unit configured to update the three-dimensional map with reference to the virtual feature points in the virtual image.

(Supplementary Note 2)

The map generation apparatus described in Supplementary Note 1, wherein the virtual image generation unit is configured to generate the virtual image by performing a homographic transformation of the still images.

(Supplementary Note 3)

The map generation apparatus described in Supplementary Note 2, wherein the virtual image generation unit is configured to derive a homography matrix to be used in the homographic transformation using projection positions of the three-dimensional positions of the feature points on the virtual frame indicating a size of still images shot from the virtual viewpoint in the case where the three-dimensional positions of the feature points are projected on the virtual frame, and the feature points in the still images.

(Supplementary Note 4)

The map generation apparatus described in Supplementary Note 3, wherein the virtual image generation unit is configured to derive the homography matrix using the projection positions of the three-dimensional positions of the feature points on the virtual frame of a case where among the three-dimensional positions of the plurality of the feature points on the three dimensional map corresponding to the three-dimensional positions of the plurality of the feature points in the still images, the three-dimensional positions of the feature points existing in a predetermined area are projected on the virtual frame.

(Supplementary Note 5)

The map generation apparatus described in Supplementary Note 3 or 4, wherein the virtual image generation unit is configured to derive the homography matrix using the projection positions of the feature points on the virtual frame of a case where the three-dimensional positions of the feature points in an arbitrary plane of a three-dimensional space among the feature points in the still images are projected on the virtual frame.

(Supplementary Note 6)

The map generation apparatus described in Supplementary Note 5, wherein the virtual image generation unit is configured to identify the plane by performing a principal component analysis of the three-dimensional positions of the feature points on the three-dimensional map corresponding to the feature points in the still images.

(Supplementary Note 7)

The map generation apparatus described in any one of Supplementary Notes 1 to 6, wherein the update unit is configured to update the three-dimensional map with reference to, among the virtual feature points in the virtual images, the virtual feature points for which a distance from the projection positions of the feature points on the virtual frame is equal to or smaller than a threshold value in the case where the three-dimensional positions of the feature points are projected on the virtual frame indicating the size of the still images that are shot from the virtual viewpoint.

(Supplementary Note 8)

The map generation apparatus described in any one of Supplementary Notes 1 to 7, wherein the update unit is configured to associate at least one of the still images containing the feature points corresponding to the virtual feature points with one of the virtual feature points in the virtual images.

(Supplementary Note 9)

The map generation apparatus according to Supplementary Note 7 or 8, wherein the virtual image generation unit is configured to extract the virtual feature points for a partial region of the virtual images.

(Supplementary Note 10)

A map generation method executed in a map generation apparatus, the method comprising:

generating a three-dimensional map showing an environment around a photographing device by identifying shooting locations of a plurality of still images shot by the photographing device and restoring three-dimensional positions of feature points marked in each image of the plurality of the still images;

generating a virtual image of a case in which the three-dimensional positions of the feature points on the three-dimensional map corresponding to the feature points in the still images are shot from a virtual viewpoint; and updating the three-dimensional map with reference to the virtual feature points in the virtual image.

(Supplementary Note 11)

A computer-readable medium storing a program for causing a computer to:

generate a three-dimensional map showing an environment around a photographing device by identifying shooting locations of a plurality of still images shot by the photographing device and restoring three-dimensional positions of feature points marked in each image of the plurality of the still images;

generate a virtual image of case in which the three-dimensional positions of the feature points on the three-dimensional map corresponding to the feature points in the still images are shot from a virtual viewpoint; and update the three-dimensional map with reference to the virtual feature points in the virtual image.

REFERENCE SIGNS LIST

10 MAP GENERATION APPARATUS
11 THREE-DIMENSIONAL MAP GENERATION UNIT
12 VIRTUAL IMAGE GENERATION UNIT
13 UPDATE UNIT
20 MAP GENERATION APPARATUS
21 FEATURE POINT EXTRACTION UNIT
22 3D POSITION SPECIFYING UNIT
23 THREE-DIMENSIONAL MAP STORAGE UNIT
31 PHOTOGRAPHING DEVICE
32 ENVIRONMENTAL IMAGE
41 VIRTUAL CAMERA
42 VIRTUAL FRAME
51 AREA
52 PLANE

What is claimed is:

1. A map generation apparatus comprising:
at least one memory storing instructions, and
at least one processor configured to execute the instructions to:
generate a three-dimensional map showing an environment around a photographing device by identifying shooting locations of a plurality of still images shot by the photographing device and restoring three-dimensional positions of feature points marked in each image of the plurality of still images;

generate a virtual image in a case in which the three-dimensional positions of the feature points on the three-dimensional map corresponding to the feature points in the plurality of still images are shot from a virtual viewpoint; and update the three-dimensional map with reference to virtual feature points in the virtual image, wherein the at least one processor is further configured to execute the instructions to update the three-dimensional map with reference to, among the virtual feature points in the virtual image, virtual feature points for which a distance from projection positions of the feature points on a virtual frame is equal to or smaller than a threshold value in a case where the three-dimensional positions of the feature points are projected on the virtual frame indicating a posture of the photographing device when shooting is performed from the virtual viewpoint and an angle of view of the virtual image.

2. The map generation apparatus according to claim 1, wherein the at least one processor is further configured to execute the instructions to generate the virtual image by performing a homographic transformation of the plurality of still images.

3. The map generation apparatus according to claim 2, wherein the at least one processor is further configured to execute the instructions to derive a homography matrix to be used in the homographic transformation using projection positions of the three-dimensional positions of the feature points on the virtual frame indicating the posture of the photographing device that has performed shooting of the plurality of still images from the virtual viewpoint and the angle of view of the virtual image of the case where the three-dimensional positions of the feature points are projected on the virtual frame, and the feature points in the plurality of still images.

4. The map generation apparatus according to claim 3, wherein the at least one processor is further configured to execute the instructions to derive the homography matrix using the projection positions of the three-dimensional positions of the feature points on the virtual frame of a case where among the three-dimensional positions of the plurality of feature points on the three-dimensional map corresponding to the three-dimensional positions of the plurality of feature points in the plurality of still images, the three-dimensional positions of the feature points existing in a predetermined area are projected on the virtual frame.

5. The map generation apparatus according to claim 3, wherein the at least one processor is further configured to execute the instructions to derive the homography matrix using the projection positions of the feature points on the virtual frame in a case where the three-dimensional positions of the feature points in an arbitrary plane of a three-dimensional space among the feature points in the plurality of still images are projected on the virtual frame.

6. The map generation apparatus according to claim 5, wherein the at least one processor is further configured to execute the instructions to identify the plane by performing a principal component analysis of the three-dimensional positions of the feature points on the three-dimensional map corresponding to the feature points in the plurality of still images.

7. The map generation apparatus according to claim 1, wherein the at least one processor is further configured to execute the instructions to extract the virtual feature points for a partial region of the virtual image.

8. The map generation apparatus according to claim 1, wherein the at least one processor is further configured to execute the instructions to associate at least one of the plurality of still images having the feature points corresponding to the virtual feature points with one of the virtual feature points in the virtual image.

9. A non-transitory computer-readable medium storing a program for causing a computer to:
   generate a three-dimensional map showing an environment around a photographing device using a plurality of still images shot by the photographing device by identifying shooting locations of the plurality of still images shot by the photographing device and restoring three-dimensional positions of feature points marked in each image of the plurality of still images;
   generate a virtual image in a case in which the three-dimensional positions of the feature points on the three-dimensional map corresponding to the feature points in the plurality of still images are shot from a virtual viewpoint; and
   update the three-dimensional map with reference to, among virtual feature points in the virtual image, the virtual feature points for which a distance from projection positions of the feature points on a virtual frame is equal to or smaller than a threshold value in a case where the three-dimensional positions of the feature points are projected on the virtual frame indicating a posture of the photographing device when shooting is performed from the virtual viewpoint and an angle of view of the virtual image.

10. A map generation method executed in a map generation apparatus, the method comprising:
   generating a three-dimensional map showing an environment around a photographing device using a plurality of still images shot by the photographing device by identifying shooting locations of the plurality of still images shot by the photographing device and restoring three-dimensional positions of feature points marked in each image of the plurality of still images;
   generating a virtual image in a case in which the three-dimensional positions of the feature points on the three-dimensional map corresponding to the feature points in the plurality of still images are shot from a virtual viewpoint; and
   updating the three-dimensional map with reference to, among virtual feature points in the virtual image, the virtual feature points for which a distance from projection positions of the feature points on a virtual frame is equal to or smaller than a threshold value in a case where the three-dimensional positions of the feature points are projected on the virtual frame indicating a posture of the photographing device when shooting is performed from the virtual viewpoint and an angle of view of the virtual image.

* * * * *